(12) United States Patent
Fraden

(10) Patent No.: US 7,374,336 B2
(45) Date of Patent: May 20, 2008

(54) CONTACT THERMOMETER FOR BODY CAVITY

(76) Inventor: Jacob Fraden, 2611 Hidden Valley Rd., La Jolla, CA (US) 92037

( * ) Notice: Subject to any disclaimer, the term of this patent is extended or adjusted under 35 U.S.C. 154(b) by 0 days.

(21) Appl. No.: 10/870,803

(22) Filed: Jun. 18, 2004

(65) Prior Publication Data
US 2005/0281314 A1 Dec. 22, 2005

Related U.S. Application Data

(60) Provisional application No. 60/478,362, filed on Jun. 16, 2003.

(51) Int. Cl.
*G01K 1/00* (2006.01)
(52) U.S. Cl. ...................... 374/208; 374/100
(58) Field of Classification Search ................ 374/208, 374/100; D10/57
See application file for complete search history.

(56) References Cited
U.S. PATENT DOCUMENTS

| | | | | |
|---|---|---|---|---|
| 4,183,248 A | * | 1/1980 | West | 374/164 |
| 5,458,121 A | * | 10/1995 | Harada | 600/474 |
| 5,632,555 A | * | 5/1997 | Gregory et al. | 374/102 |
| 5,833,367 A | * | 11/1998 | Cheslock et al. | 374/158 |
| 6,406,182 B1 | * | 6/2002 | Chen | 374/208 |
| 6,979,122 B2 | * | 12/2005 | Yu | 374/208 |
| 7,052,471 B2 | * | 5/2006 | Lussier et al. | 600/549 |
| 7,213,969 B2 | * | 5/2007 | Russak et al. | 374/208 |
| 2003/0212339 A1 | * | 11/2003 | Lussier et al. | 600/549 |

* cited by examiner

*Primary Examiner*—Gail Verbitsky
*Assistant Examiner*—Megann E Vaughn

(57) ABSTRACT

A contact thermometer for determining-temperature of an inner wall of a cavity, where accuracy and speed response is assured by use of a probe having a variable geometry where the first shape of the probe exists before and during placing the probe into a cavity and the second shape is formed during the measurement process. The temperature measuring tip of the probe makes an intimate thermal contact with an inner wall of a cavity after the second geometrical shape is assumed. The accuracy is assured by use of at least two temperature sensors while the speed response is improved by taking at least two readings, from one temperature sensor.

14 Claims, 6 Drawing Sheets

CONTACT THERMOMETER FOR BODY CAVITY

This invention claims the benefit of priority to Provisional U.S. Patent Application No. 60/478,362 filed on Jun. 16, 2003 and relates to devices for measuring temperature, more specifically to contact thermometers, primarily intended for medical and veterinary applications.

FIELD OF INVENTION

Description of Prior Art

A body cavity thermometer (BCT) is a device capable of measuring temperature from a body cavity. An example of a body cavity is rectum of a large animal, such as a horse or cow. In a general veterinary practice, a rectum, if not terribly convenient, yet it's the only practical site for quick assessing the animal's internal body temperature. A known alternative, an infrared ear thermometer, frequently is not practical for some large animals. This limitation is mainly a result of either a hyper sensitivity at the ear area (horses) or very dirty ear canals (cows). These factors make use of the infrared radiation thermometers quite inaccurate and, as a result, impractical. Thus, a rectum still remains the only practical orifice of choice for many large animals. Another example of a BCT is an industrial hand-held thermometer that intermittently measures the internal temperature of a vessel or other hollow object by contacting it's inside walls.

The presently used BCTs are either the conventional mercury-in-glass or electronic contact thermometers (thermistors, thermocouples, etc.). These thermometers may be well calibrated and generally exhibit high accuracy under the laboratory conditions. Yet, there are two major problems in using such thermometers with the real cavities. The first one is a large uncertainty concerning quality of a thermal contact (coupling) between the thermometer probe and a cavity wall, such as rectal tissue. A poor thermal coupling results in a reduced accuracy—such a thermometer will read generally lower than the true temperature is. Another problem is a speed response, which again is a result of quality of a thermal contact and a thermal capacity of the temperature probe. It is not uncommon for a conventional BCT to complete a reading within 1 minute or even longer. In a veterinary medicine, restraining a large animal for such a long time sometimes is difficult and often expensive. In prior art, numerous thermometers are known that use a variety of means to improve thermal coupling with a body cavity. By a way of example only, but not relying upon, we reference U.S. Pat. No. 5,178,466 issued to Chiu. A known means of improving a speed response of a contact thermometer is a predicting technique that are covered by numerous U.S. patents exemplified by U.S. Pat. No. 3,978,325. Some of the predictive techniques rely on a software data processing, while others—on a hardware design. For instance, U.S. Pat. No. 3,872,726 issued to Kauffeld et al. teaches forecasting the ultimate temperature of a slow responding thermistor in a contact thermometer by using a hardware integrator. Yet, there is no know design of BCT that is practical, accurate and easy to use; Therefore it is a goal of this invention to provide a contact body cavity thermometer that during the measurement makes a good thermal contact with a body cavity;

It is another object of this invention to make a contact body cavity thermometer with a short response time;

And the other goal of the invention is to improve accuracy of temperature measurement;

And it is another goal of this invention to make a temperature probe that minimized a risk of transmitting infection or soiling the instrument.

SUMMARY OF THE INVENTION

The contact thermometer of this invention has a temperature sensing element is attached to a moving tip whose position is automatically adapted to the location of a body cavity wall. Thus, the accuracy and speed response is assured by use of a probe having a variable geometry where the first shape of the probe exists before placing the probe into a cavity and the second shape is formed during the measurement process. The accuracy is further enhanced by use of at least two temperature sensors where at least one measures temperature of the contact area with the body cavity wall and the other temperature sensor is for compensating of the heat flow.

DETAILED DESCRIPTION

Two major issues of a cavity temperature measurement are resolved in the present invention by providing several solutions. The first issue is making a reliable thermal contact between a sensing element (temperature sensor) and the body cavity wall. The second issue is assuring a fast measurement time.

The first issue with temperature measurement is to assure that a sensing element is either in thermal equilibrium with a measured surface or it's thermal response is moving fast toward such an equilibrium. To address this issue properly, it is essential to make a good and reliable thermal contact between a sensor and an inner wall of the body cavity. A lack of a good thermal coupling inadvertently will result in reduced accuracy and a longer response time. Since a body cavity generally may have an unpredictable shape and size, a means for a fast and reliable attachments of a temperature sensor to the cavity inner wall under these conditions shall be provided. The present invention addresses this issue by making a temperature sensing probe of a variable shape. In other words, the probe may change its physical shape and dimensions on a command by an operator or a control device. Before, during and immediately after the insertion of the probe into a body cavity, a shape is more or less predefined and generally has the smaller overall dimensions which helps to insert the probe into the orifice. Before the measurement is to be performed while the probe is still inserted, an actuation mechanism changes a shape of the probe so that its dimensions are expanded to such a degree as to move the temperature sensing tip toward the cavity wall and position it in an intimate thermal coupling with that wall. Therefore, the probe must be provided with an actuation mechanism for moving the temperature sensing portion of the probe toward the body cavity wall and holding it there for the time of measurement.

It should be noted that a temperature measurement is an obvious application of the probe having a variable geometry. However, many other sensors may benefit from an ability to be attached to the cavity wall by a flexing probe. An example of such a sensor would be an ultrasonic transducer. Below, however, we focus on temperature measurement as the most popular application of the sensing probe having a variable geometry.

Figure 1:
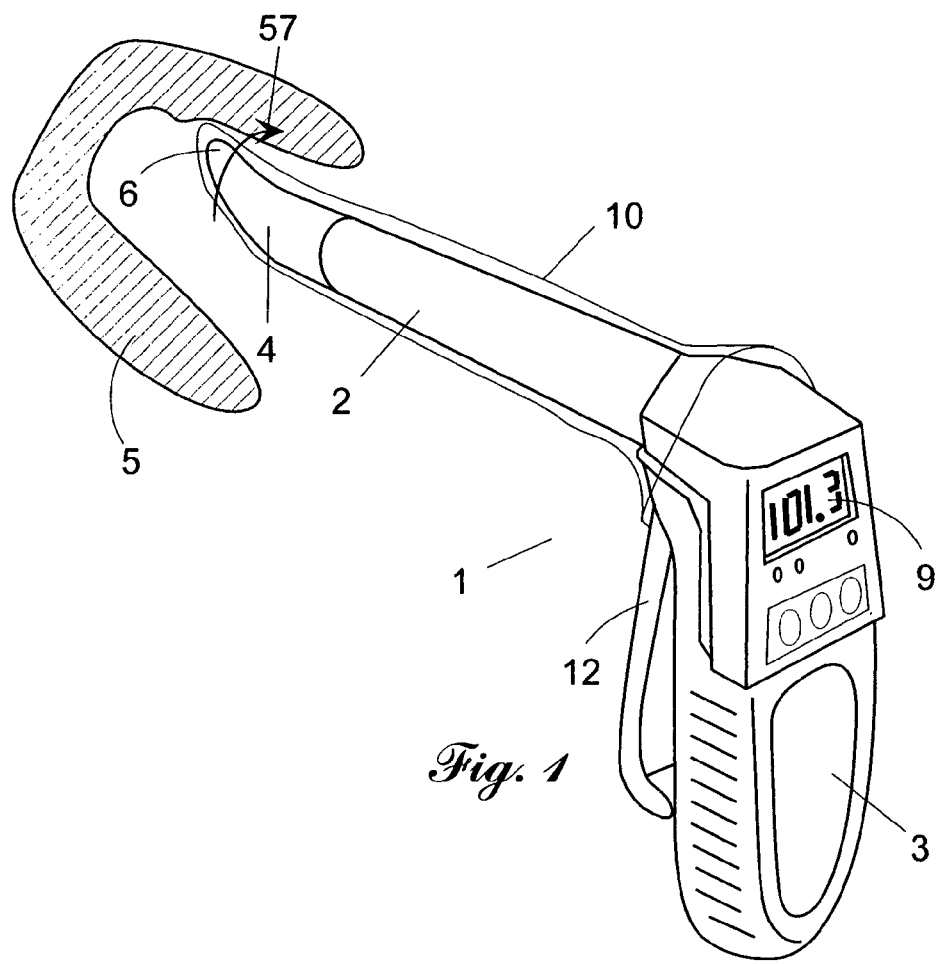
FIG. 1 depicts an overall view of the cavity thermometer

FIG. 1 illustrates an overall view of a body cavity thermometer 1. Its probe 2 is attached to housing 3. Housing 3 contains a power supply and all necessary electrical and mechanical-parts needed for the device operation. Display 9 presents the result of measurement. Trigger 12 is used for a manual actuating the measurement and to control the shape of probe measuring head 4. The probe has a distal end with tip 6. Tip 6 must come into an intimate thermal contact with measured surface that is an inner wall of cavity 5. Note that head 4 bends, that is, it changes its shape so that temperature sensing tip 6 moves outwardly in direction 57.

Figure 2:
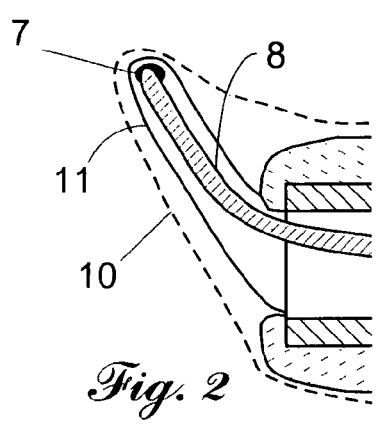
FIG. 2 shows a cross-sectional view of the probe tip

An example of probe tip 6 is shown if FIG. 2. The tip incorporates first temperature sensor 7 supported by finger 8. Finger 8 should have as low thermal conductivity as possible to minimize heat loss from first temperature sensor 7. A flexible membrane 11 envelops first temperature sensor 7 without interfering with its movement. An additional enveloping probe cover 10 may be added to further protect the tip from soiling and damage. Probe cover 10 may be a reusable or disposable and fabricated of inexpensive thin film, such as, for example polyethylene having thickness on the order of 0.001" and usually no greater than 0.003".

Figure 3:
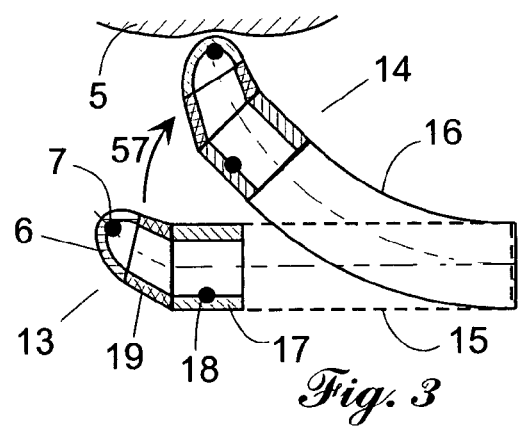
FIG. 3 is the sensing head at two different shapes
Figure 7:
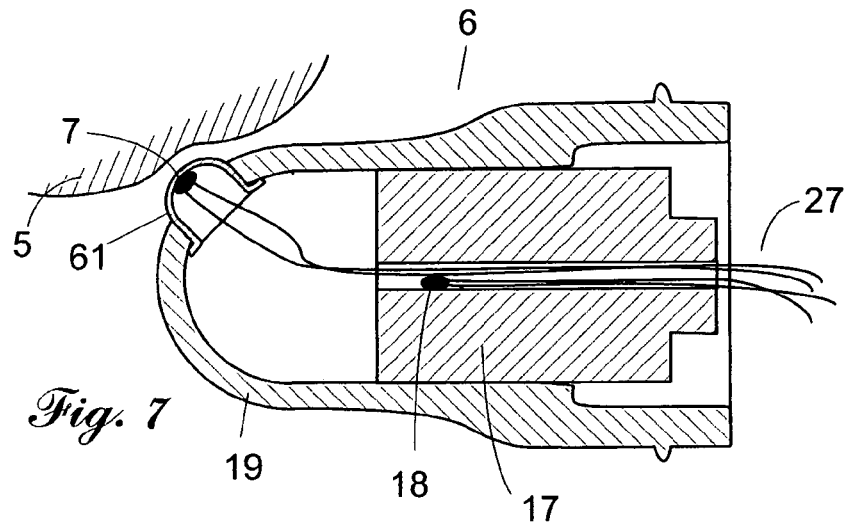
FIG. 7 is a cross-sectional view of the probe tip with a thermal mass

Another example of a moving tip 6 is shown in FIG. 3. An external actuator or actuation mechanism (not shown in FIG. 3) is required to change shape of rod 15. Before actuation, rod 15 has first shape 13 which is straight. Upon actuation, rod 15 bends in direction 57 assuming second shape 14 so that rod 15 is transformed into rod 16 having generally larger overall dimensions. Its tip carries the sensing assembly and moves toward a wall of cavity 5. In this illustration, the tip contains two temperature sensors 7 and 18 mounted respectively in tip 6 and thermal mass 17. Tip 6 and thermal mass 17 are separated by thermal insulator 19. Second sensor 18 serves as a reference and its temperature should change slower as compared with a fast response of first sensor 7. Tip 6 should have as low thermal mass and as a high thermal conductivity as possible. Use of second sensor 18 allows to compensate for heat flow from first sensor 7 toward the probe as explained in detail below. A practical design of moving tip 6 is shown in FIG. 7. First sensor 7 is mounted inside metal cup 61 and the entire tip 6 is housed in plastic housing 19 to reduce heat transfer. Thermal mass 17 has in imbedded second sensor 18. Connecting wires 27 pass through thermal mass to assure that they have the same temperature as second sensor 18.

Figure 4:
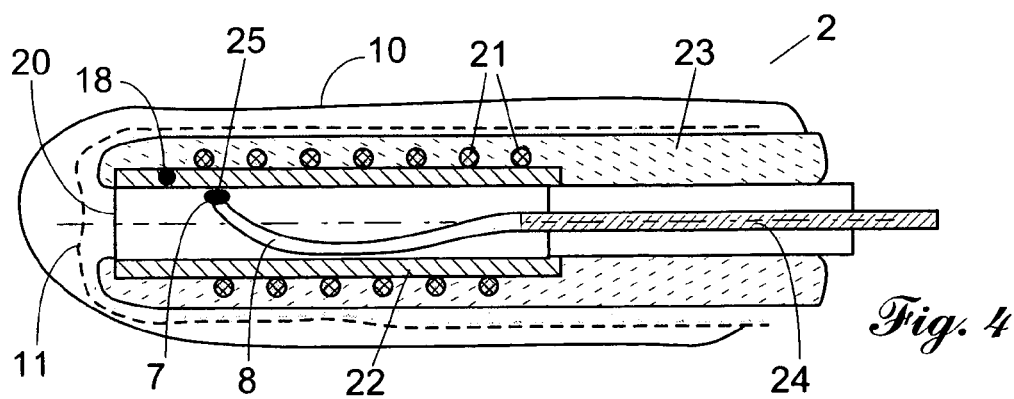
FIG. 4 shows a cross-sectional view of a heated probe with a sensor in a stand-by position
Figure 5:
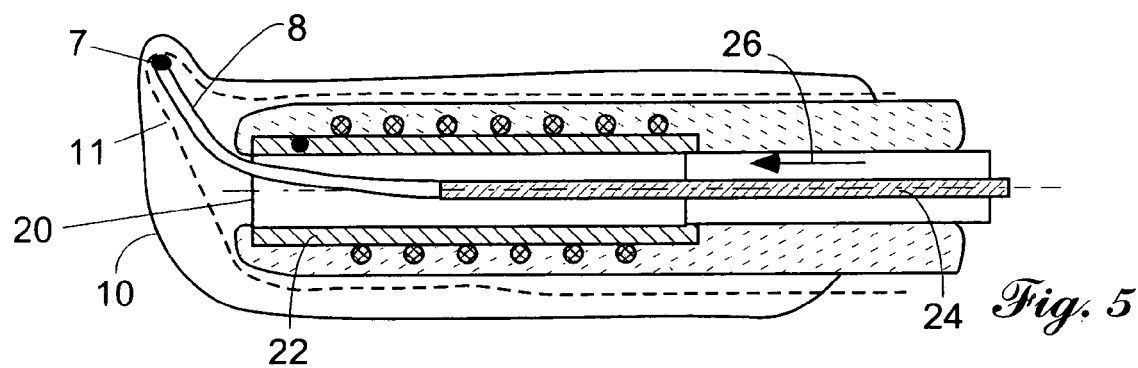
FIG. 5 is the same probe as in FIG. 4 but with the extended sensor

One practical way of moving sensing tip 6 is shown in FIG. 4 where the probe is presented in a stand-by position, that is, in the state which is assumed before, during and immediately after the insertion into a body cavity. Probe 2 is of a generally cylindrical shape. Outer jacket 23 is preferably made of plastic and has low thermal conductivity. Jacket 23 may incorporate several layers (not shown) to enhance thermal insulation. Such layers may be made of air or foam. Inside jacket 23, there is a hollow metal cylinder 22 that has high thermal capacity and high thermal conductivity. Its purpose is the same as that of thermal mass 17 of FIG. 3. Inside cylinder 22, there is a movable finger 8 that has first temperature sensor 7 attached to its end. Finger 8 is made of a flexible resilient material and is pre-stressed inside cylinder 22 to assume shape that fits inside cylinder 22. Finger 8 may be moved and guided inside cylinder 22 with pusher 24, which, in turn, is attached to an external linear motion mechanism. Note a second sensor 18 in contact with cylinder 22. FIG. 5 illustrated the expanded probe after it is inserted into a body cavity. On a command from an operator or an external actuator, plunger 24 moves in direction 26, causing finger 8 to slide out of cylinder 22 through opening 20. Distal end of finger 8 bends outwardly to assume its unstressed shape. It pushes first sensor 7 against membrane 11 and probe cover 10 toward a wall of a body cavity. Note that probe cover 10 expands and may stretch to accommodate movement of second sensor 7. Now, probe is assumed a new shape that forces second sensor 7 to make an intimate thermal contact with a body cavity.

One of substantial error sources in temperature measurement is heat flow to or from the main sensing element which in this invention is represented by first sensor 7. While second temperature sensor 18 is intended for compensation of heat flow from first sensor 7, further reduction of heat flow can be accomplished by reduction of thermal gradient between these sensors. In FIGS. 4 and 5 by way of example, heater 21 is added. It is in intimate thermal coupling with second sensor 18 and cylinder 22. Before finger 8 moves out of cylinder 22 (FIG. 4), first sensor 7 also thermally connected to cylinder 22 at contact point 25, thus both sensors are at close temperatures. When finger 8 moves out (FIG. 5), first sensor temperature changes because it contacts the cavity wall. By a feedback circuit from heat controller, temperature of cylinder 22 is maintained before and during the measurement close to that of the anticipated temperature of a cavity, thus minimizing heat loss.

Figure 8:
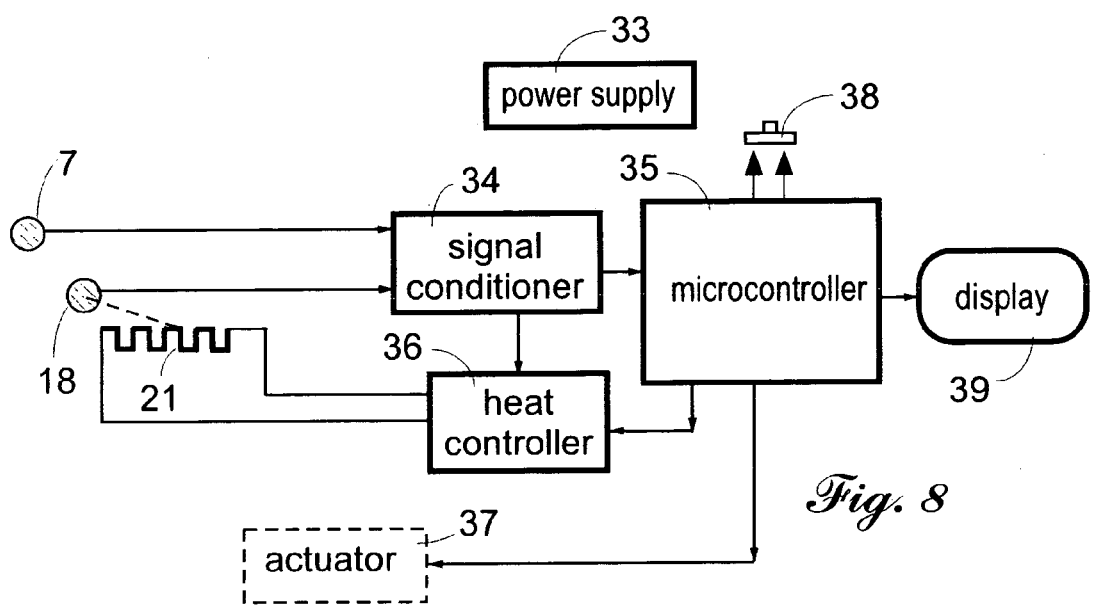
FIG. 8 is a block diagram of a thermometer with a heater

FIG. 8 illustrates a block diagram of the thermometer, where heater 21 is attached to heat controller 36 that, in turn, receives commands from second sensor 18 and microcontroller 35, thus forming a conventional thermostat. Signal conditioner 34 converts signals from temperature sensors to an acceptable level and format. Sensors 7 and 18 can be thermistors, semiconductors, RTD or other common temperature detectors. The measurement cycle is initiated by start switch 38 and the result is presented on display 39. Actuator 37 is present if geometry of the probe is changed on command from microcontroller 35, rather than manually.

Figure 9A:
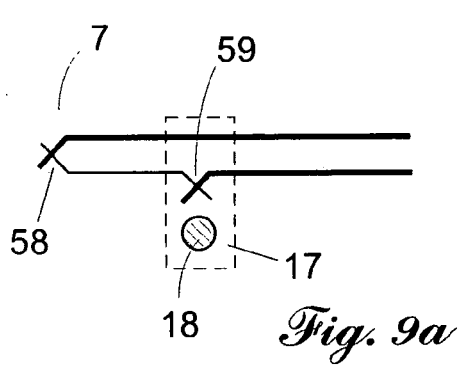
FIG. 9a is a combination of a thermocouple and an absolute sensor
Figure 9B:
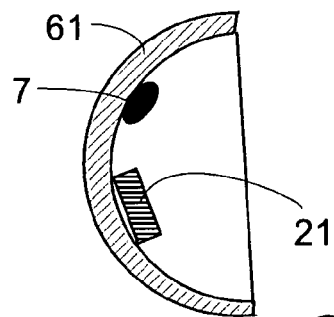
FIG. 9b is a tip of the probe with a heater

FIG. 9b shows heater 21 imbedded into a metal cap 61 along with sensor 7. This makes heating of the tip much faster.

FIG. 9a illustrates two temperature sensors 7 and 18 where first sensor 7 is a thermocouple's first junction 58. Note that the reference junction 59 is in an intimate thermal coupling with second temperature sensor 18 which is not a thermocouple, but rather one of the absolute type temperature sensors such as a thermistor, RTD, etc. Thermal contact is assured by common thermal mass 17.

Figure 6:
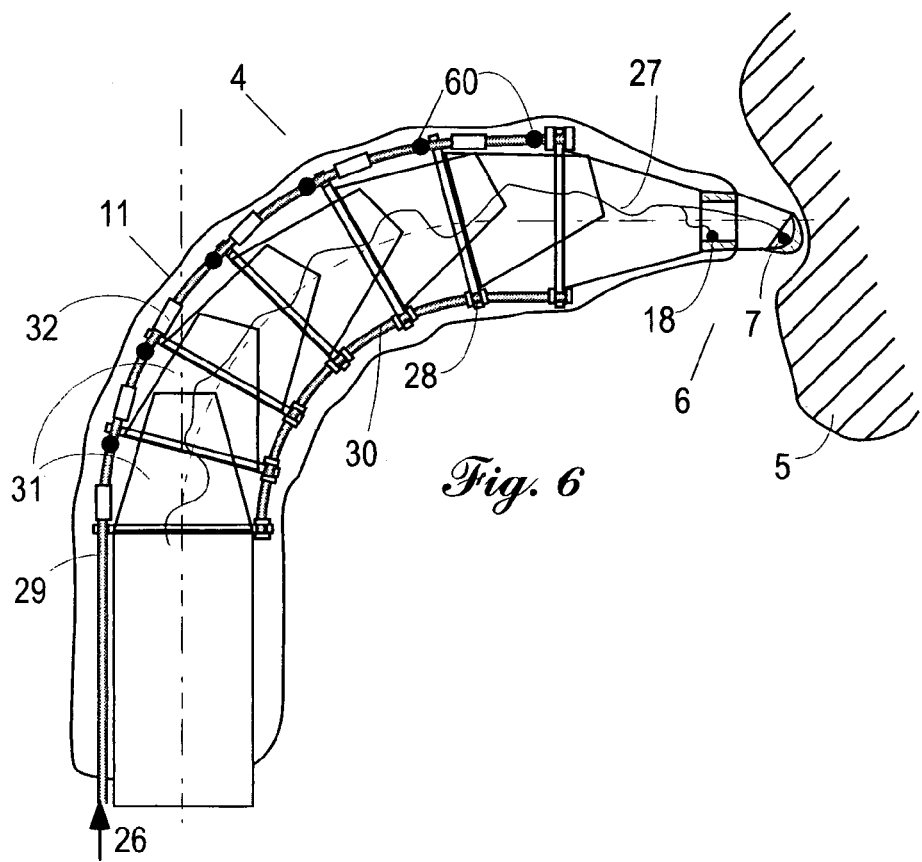
FIG. 6 shows a "rattle-snake" tip of the probe

An effective way of moving measuring head 4 is shown in FIG. 6. The entire assembly resembles a rattle snake tail. Measuring head 4 comprises a number of stacked frustums 31 that are joined together by first cable 29 and second cable 30. Second cable 30 is stationary while first cable 29 can be moved in direction 26. All frustums 31 are permanently attached to second cable 30 at joints 28. Frustums 31 are separated at first cable 29 by spacers 32. First cable 29 has permanently attached grips 60 which can push frustums 31. The entire head 4 is enveloped by flexible membrane 11 that is made, for example of urethane. First and second temperature sensors 7 and 18 respectively are positioned at the end of head 4 allowing sensor 7 to make thermal contact with cavity 5. When first cable 29 is pushed in direction 26, grips 60 engages frustums 31 and push them outwardly. Thus, frustums 31 slide and rotate with respect to each other forcing tip 6 to move toward the wall of cavity 5. Sensors 7 and 18 are connected to the external circuit via wires 27. First cable 29 can be moved either manually or by an actuator (not shown) on command from the microcontroller. Examples of an actuator are a motor, a solenoid or a shape memory alloy (SMA) device.

Figure 10:
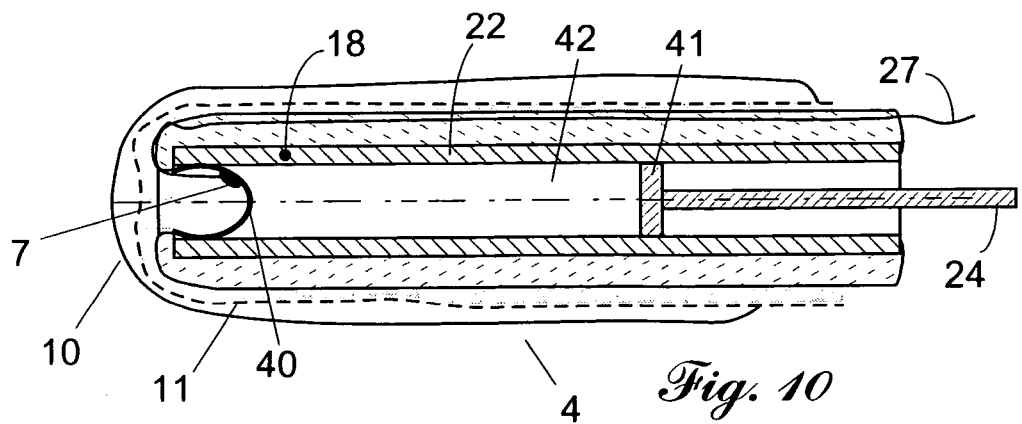
FIG. 10 shows a cross-sectional view of a probe with a pneumatic mechanism
Figure 11:
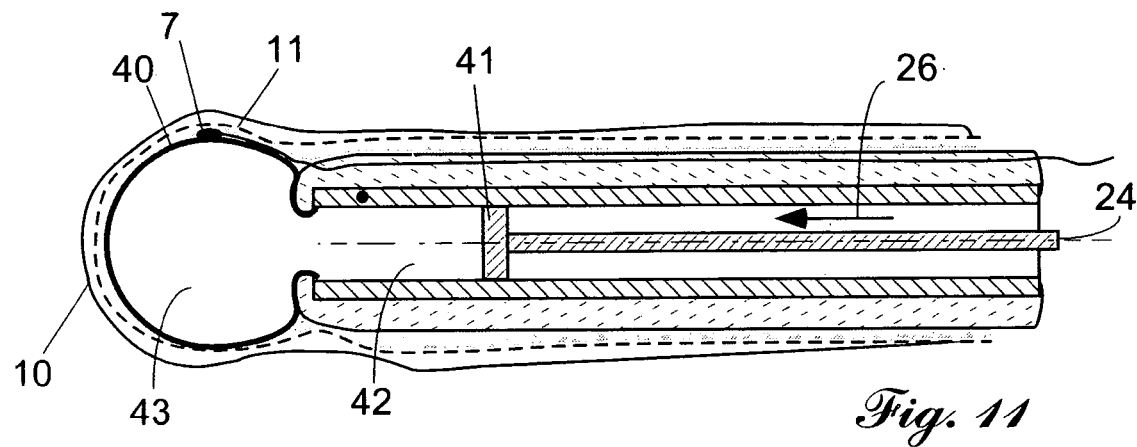
FIG. 11 shows the probe of FIG. 10 with the inflated bubble.

Another possible embodiment of a measuring head 4 and an actuator is shown in FIGS. 10 and 11. The tip of measuring head 4 has an opening covered with stretchable sheet 40 that is made of a thin rubber-like material, like urethane. There is first sensor 7 attached to the surface of sheet 40. The overall surface of head 4 is protected my stretchable membrane 11 and also may be covered by probe cover 10. Before temperature is measured, sheet 40 is positioned inside cylinder 22 that is air tight. The cylinder is limited at the opposite side by movable plunger 41 attached to pusher 24. After the probe is inserted into a cavity, pusher 24 moves plunger 41 in direction 26 (FIG. 11) causing air pressure in space 42 to increase. This forces sheet 40 to expand forming bubble 43. Since first sensor 7 is attached to sheet 40, it moves outwardly toward cavity walls (not shown). After temperature is measured, plunger 41 is moved in the opposite direction, reducing air pressure and making bubble 43 to collapse back to its original shape shown in FIG. 10.

Figure 12:
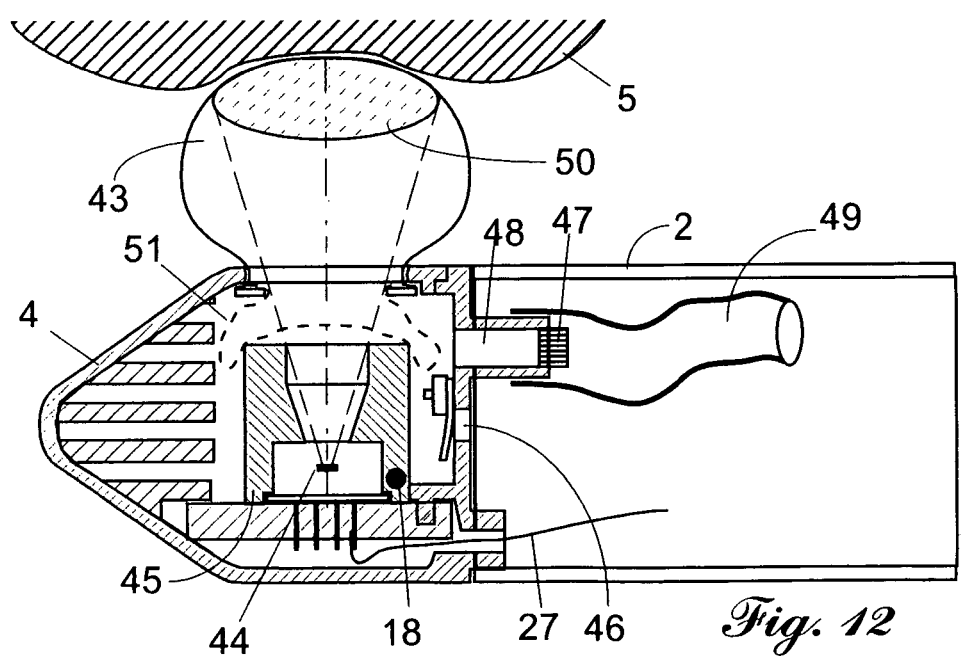
FIG. 12 shows a cross-sectional view of a probe with an inflated bubble and infrared sensor
Figure 14:
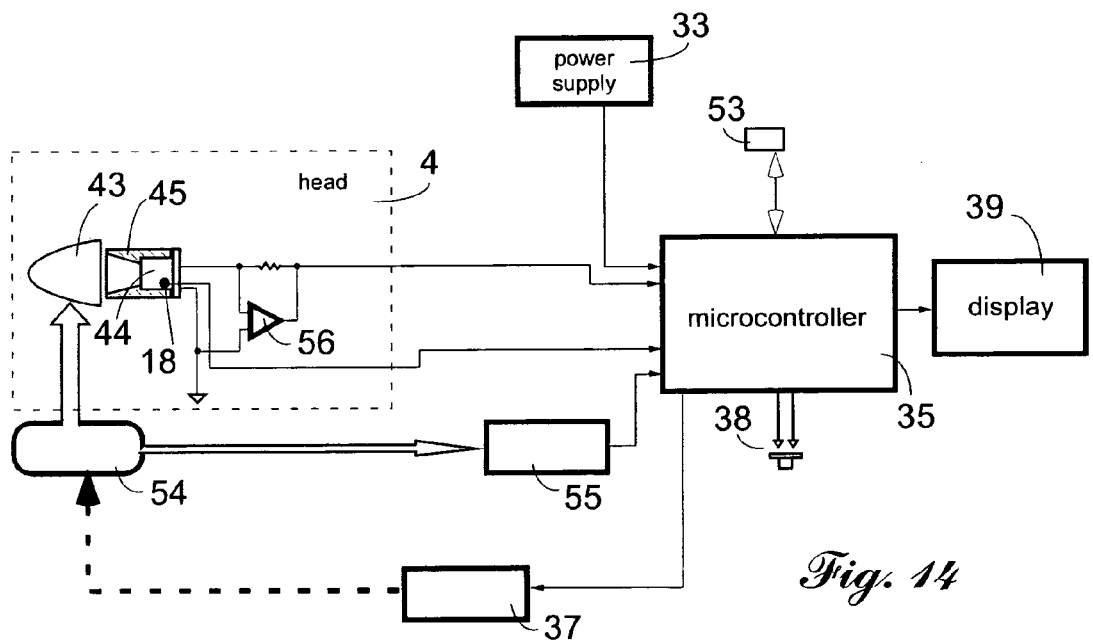
FIG. 14 is a block diagram of a thermometer with an infrared sensor

And another embodiment of measuring head 4 that uses an inflatable bubble is shown in FIG. 12. It employs a noncontact infrared (IR) sensor 44 to measure the inner temperature of bubble 43. Air pressure is supplied from an external pump via hose 49 through air filter and inlet 48. Infrared sensor, for example, a thermopile, is provided with optical system 45 that forms view area 50 on the inner surface of bubble 43, when formed. Before the bubble is formed, sheet 51 is collapsed inside the sensing head (shown with dotted line). IR sensor 44 is connected to an amplifier via wires 27. The equalize pressure during deflation, the device may be supplied with vent 46 that is closed during inflation. Second sensor 18 is in thermal contact with IR sensor 44 and preferably with optical system 45. Optical system 45 may be made in shape of a reflective hollow tube of conical, cylindrical or parabolic profiles. Inner surface of the optical system needs to be polished and coated with gold for better reflectivity. An alternative optical system may include a focusing module with a plastic (Fresnel) or crystal lens. Designs of such optical systems are well known in art and thus not described here in detail. A corresponding block-diagram is shown in FIG. 14. Actuator 37 either on a manual command or on command from microcontroller 35 makes pump 54 to inflate bubble 43. Amplifier 56 is required to condition a signal from IR sensor 44. Air pressure detector 55 may be required to signal the microcontroller of the level of bubble inflation and possible malfunctions.

Figure 15:
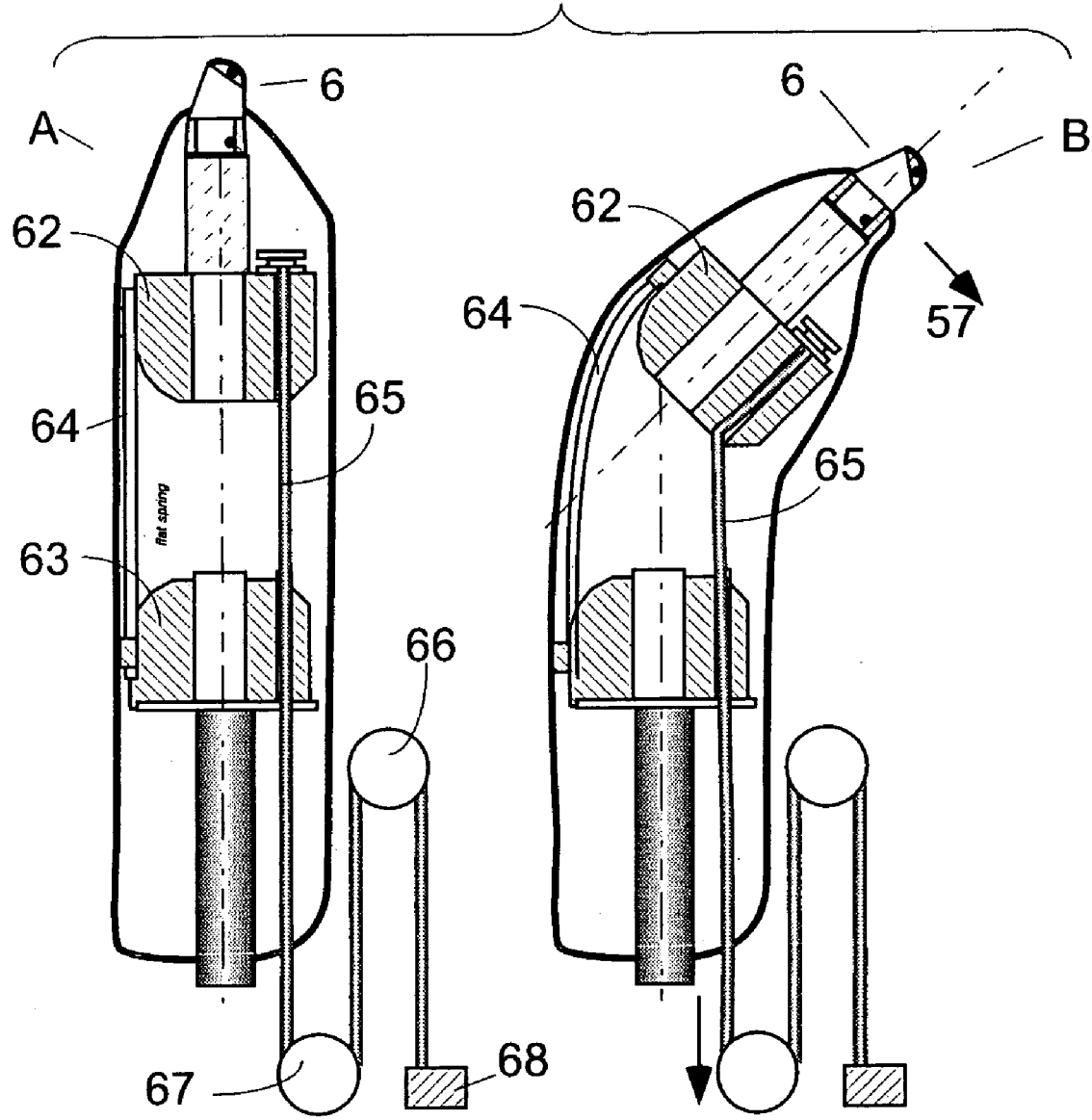
FIG. 15 shows two positions of the probe with the SMA ally wire actuator

And another actuation device is shown in FIG. 15. It takes an advantage of a shape memory alloy (SMA) wire 65. Left side A of FIG. 15 shows the probe containing first base 62 and second base 63 that are joined by flat spring 64. SMA wire 65 is looped via pulleys 66 and 67 and at one end is connected to anchor 68 that is fixed with respect to second base 63. The other end of SMA wire 65 is permanently attached to first base 62. When electric current passes through SMA wire 65, its rising temperature causes the wire length to reduce, thus moving wire in direction 57 as shown in the right side B of FIG. 15. A force that is developed in SMA wire 65, bends spring 64 and moves tip 6 of the probe in direction 57.

The second problem that is solved with this invention is the speed response of the BCT. The best way of speeding up the response is improving a thermal coupling as described above. This improvement is farther aided with the following steps: selecting as small first sensor 7 as practical, using thin connecting wires, pre-warming first sensor 7 to a temperature that is close to the anticipated temperature of a cavity (as in FIGS. 4, 5 and 9*b*), and using data processing algorithms that may improve the speed response. A preferred speed-up algorithm is described below.

The algorithm uses two sequential temperature measurements by first sensor 7. If we assume that thermal time constant of first sensor 7 when it is coupled to a rectal wall is τ, time delay between two sequential measurements $T_0$ and $T_1$ from the cavity wall by first sensor 7 is $t_0$, then microcontroller 35 can compute the steady-state temperature of first sensor 7 as $$T_7 = \frac{T_1 - T_0 \exp(-t_0/\tau)}{1 - \exp(-t_0/\tau)} + A, \tag{1}$$

where A is a corrective number that may be added to the computed temperature as a correction for various errors. Value of A is determined experimentally and frequently it is zero, but may be a function of probe 2 temperature that can be measured by a third temperature sensor (not shown in figures) or it may be function of second temperature sensor 18. The practical values in equation (1) may be as follows: τ=2 s and $t_0$=1 s, so the total measurement time is about 1 second. This method of computation can noticeably enhance a speed response. But there is a price for that. The better the speed enhancement the poorer the accuracy in computing $T_7$. Accuracy still can be of an acceptable level if time $t_0$ is increased to approach or exceed τ, or more than two data points are collected from the expanded probe and processed with one of many well known algorithms for improving a signal-to-noise ratio. An example of the algorithm is averaging.

To take further advantage of second sensor 18, heat flow from first sensor 7 can be compensated for by taking into account temperature gradient between sensors 7 and 18. This may be accomplished, for example, by equation that computes the final temperature of a cavity as:

$$T_h = \mu(T_7 - T_{s2}) + T_7 \tag{2}$$

where $T_{s2}$ is temperature of second sensor 18 and value of μ is found experimentally. If heater 21 is employed, value of μ is smaller, thus a smaller correction is needed. In a thermometer that does not employ a heater, a first summand in Equation (2) is larger and so the correction is larger as well.

Figure 13:
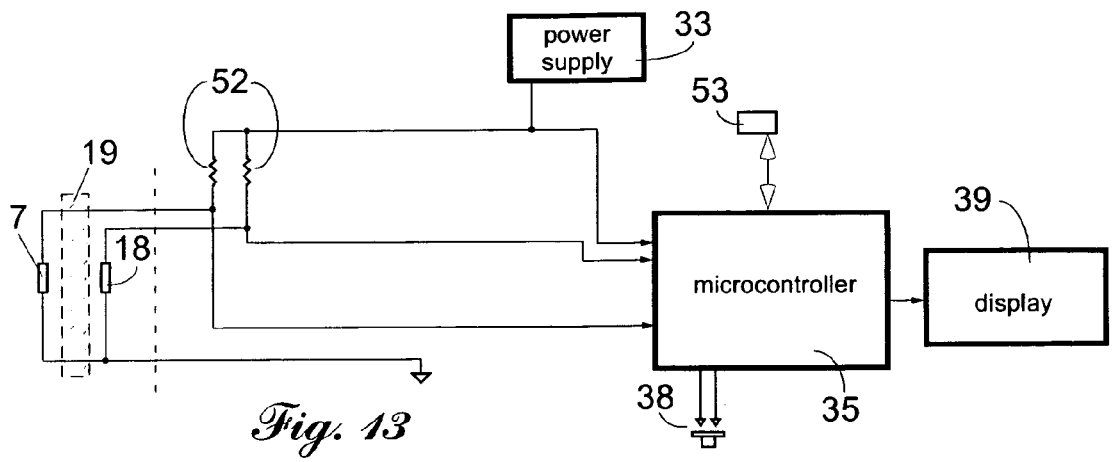
FIG. 13 is a block diagram of a thermometer with a bridge connection of the sensors

A block diagram of a cavity thermometer is presented in FIG. 13. Sensors 7 and 18 are shown as thermistors with pull-up resistors 52 thus forming a bridge circuit. Microcontroller 35 has a built-in analog-to-digital converter and on command from start switch 38 reads sequential data from first sensor 7 to solve equation (1) and then reads data from second sensor 18 to performs computation with equation (2). The calibration at factory may be performed with assistance of calibration interface 53 that allows to communicate with microcontroller 35.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A sensing device intended for receiving a signal from a surface of a cavity inner wall comprising in combination:
   an extended probe having a distal end and a proximal end;
   a sensor positioned at a said distal end of the probe;
   an electronic circuit for receiving and processing signals from the sensor, and
   an actuation mechanism;
   wherein said distal end of said probe before being inserted into said cavity assumes a first shape that upon said probe being inserted into said cavity and action of said actuation mechanism changes it to a second shape, in order to bring the sensor into a coupling position with the cavity inner wall.

2. A sensing device as defined in claim 1, wherein said device is a part of a thermometer which is intended for temperature measurement of a the cavity inner wall, wherein said sensor is a first temperature sensor.

3. A sensing device as defined in claim 2, having a second temperature sensor.

4. A sensing device as defined in claim 3 further comprising a thermal insulator positioned between said first temperature sensor and said second temperature sensor.

5. A probe as defined in claim 3, further comprising a thermal mass that is thermally coupled to the second temperature sensor.

6. A sensing device as defined in claim 2, wherein said probe further comprises an internal heater for the purpose of bringing temperature of said distal end close to the anticipated temperature of the cavity inner wall.

7. A sensing device as defined in claim 1, wherein said distal end incorporates a resilient stretchable sheet having inner and outer surfaces which upon exertion of pressure from the inside of said sensing device expands to form a bubble.

8. A sensing device as defined in claim 1 comprising a protective cover enveloping at least a potion of said extended probe wherein the protective cover is fabricated of thin pliable material.

9. A sensing device as defined in claim 1 wherein said actuation mechanism is comprised of at least two sections that can be moved with respect to one another.

10. An actuation mechanism as defined in claim 1 wherein said actuation mechanism contains a shape memory alloy wire.

11. A method of determining temperature of a cavity wall based on at least one measurement of temperature by a temperature sensor being in a thermal contact with the cavity wall, the method comprising:
    positioning said temperature sensor at the distal end of a probe having a first shape;
    inserting the distal end of the probe into said cavity;
    actuating a mechanism that is adapted for changing a shape of the distal end of the probe from said first shape to a second shape;
    changing the shape of said distal end of the probe from said first shape to the second shape;
    reading a response of said temperature sensor, and
    relating the response of the temperature sensor to temperature of said cavity wall.

12. A sensing device intended for receiving a signal from a surface of a cavity inner wall comprising in combination:
    an extended probe having a distal end and a proximal end;
    a sensor being positioned at said distal end;
    an electronic circuit for receiving and processing said signal from the sensor;
    an actuation mechanism, and
    a resilient stretchable sheet, having inner and outer surfaces, being attached to said distal end of the probe,
    wherein upon actuation of said actuation mechanism said stretchable sheet expands to form a bubble whose outer surface comes into a contact with said surface of the cavity inner wall.

13. A sensing device as defined in claim 12 wherein said sensor is attached to the inner surface of said stretchable sheet.

14. A sensing device as defined in claim 12 wherein said sensor is a noncontact infrared sensor, having a field of view that includes said inner surface of the stretchable sheet.

* * * * *